Aug. 26, 1958     W. T. MORRIS     2,848,745
TIRE CURING APPARATUS
Filed June 10, 1957
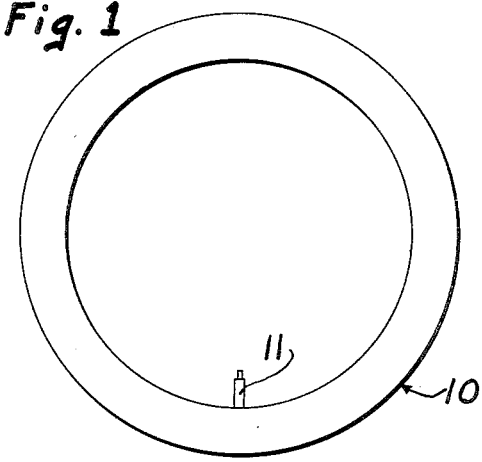
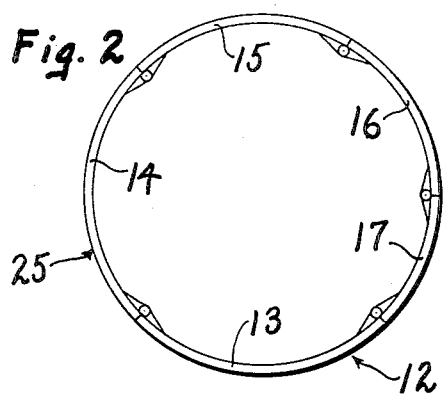
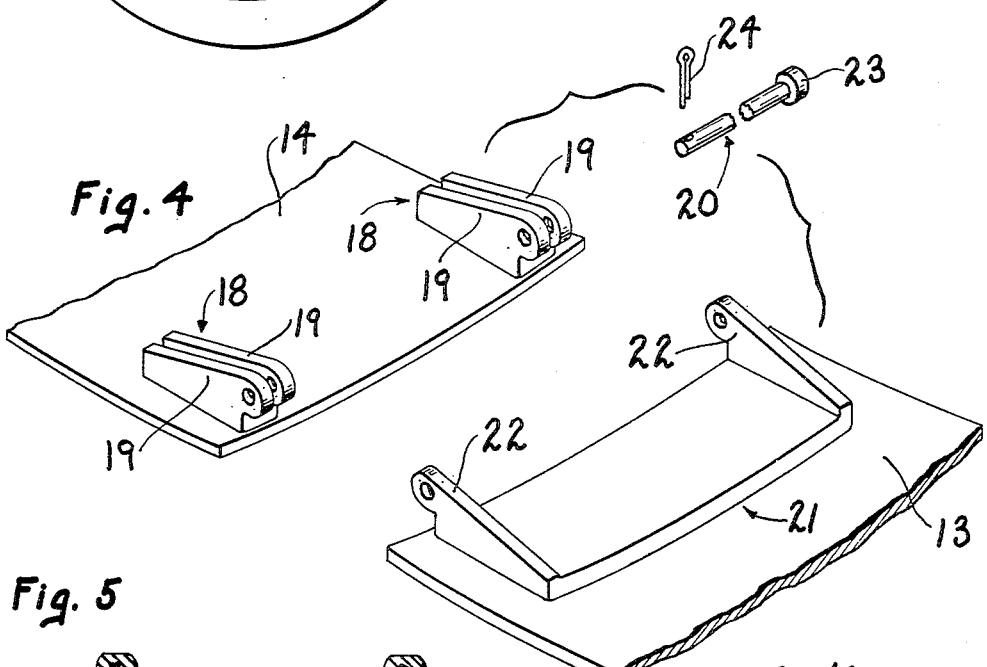
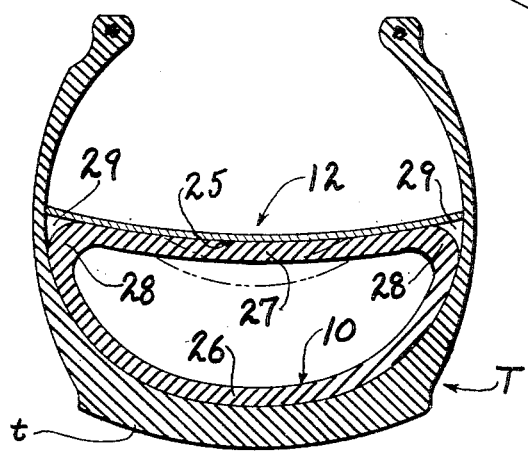
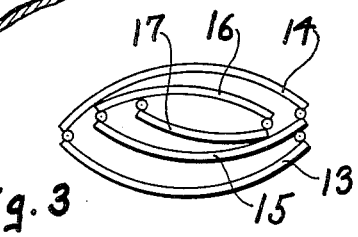
INVENTOR.
William T. Morris
BY
Attorney

United States Patent Office 2,848,745
Patented Aug. 26, 1958

2,848,745
TIRE CURING APPARATUS

William Thomas Morris, Walled Lake, Mich.

Application June 10, 1957, Serial No. 664,607

1 Claim. (Cl. 18—45)

The present invention relates to apparatus for use in retreading pneumatic tires and the principal object of my invention is to provide new and improved apparatus of such character.

When retreading pneumatic tires, the remaining old tread is first buffed off, a strip of uncured rubber is cemented to the periphery of the tire, and the latter is then placed in a mold for a period of time where the uncured rubber is cured by heat and the tread pattern is impressed therein.

In order to expand the tire into the mold and hold it in position therein during the curing operation, an annular curing tube or bag is inserted within the tire and inflated in much the same manner as the ordinary inner tube. Backing up the curing tube and maintaining it in position within the tire is an annular curing rim which is also inserted within the tire and which extends from side wall to side wall thereof. These curing rims are usually formed of a plurality of arcuate segments which are hingedly connected together to permit the rim to be folded and thus provide for easy insertion and removal of the rim from the tire.

The present invention is concerned with improvements in the curing rim and the curing tube to eliminate certain disadvantages inherent in prior art constructions.

To provide a more complete understanding of the advance in the art of the present invention, some of the problems heretofore unsolved will be briefly mentioned. Because of the flexibility required, curing tubes are made of rubber, either synthetic, natural or mixed. Unfortunately, however, all suitable rubber compounds known, have an undesirable characteristic; they stretch, or grow, after repeated cycles of inflation. This growth eventually reaches such proportions that the space provided for the tube and bounded by the inside of the tire and the confining curing rim is no longer large enough to accommodate the stretched tube.

Accordingly, in certain prior art curing-rim curing-tube combinations, the tube attempts to squeeze out around the edge of the curing rim and in so doing becomes chafed. This leads to early rupture of the curing tube and since curing tubes are quite expensive, their early failure adds materially to the cost of retreading operations, because their cost must be spread over a relatively small number of retreaded tires. In certain other prior art curing-rim curing-tube combinations, the growth of the tube makes it impossible to unfold the curing rim within the tire and lock it in place since the space normally provided for this operation is now taken up by the enlarged tube. When this condition arises, the curing tube is of no further use and must be discarded even though it is intact.

In contrast with the prior art, the present invention recognizes the inherent characteristic of rubber to grow under stress and, although tending to restrict such growth, also makes provision therefor so that the curing tube, despite its growth, may continue in unimpaired use for many times the number of cures possible with prior art constructions. Other advantages of the instant invention will readily become apparent from a study of the following description and from the drawings appended hereto.

In the drawings accompanying this specification and forming a part of this application there is shown, for purpose of illustration, an embodiment which the invention may assume, and in these drawings:

Figure 1 is an elevational view of my improved curing tube,

Figure 2 is an elevational view of a preferred embodiment of my improved curing rim shown in unfolded or collapsed relation, Figure 3 is a view similar to Figure 2 but showing the rim in folded relation, Figure 4 is an enlarged, fragmentary, exploded perspective view of the hinge arrangement connecting respective rim segments together, and Figure 5 is a further enlarged sectional view taken through a tire to be recapped and showing the curing tube and the curing rim of the instant invention in the respective positions they occupy in the tire during the curing operation.

As best seen in Figure 1, curing tube 10 is a hollow, air-tight rubber ring similar to the usual inner tube normally disposed within the tire when the latter is in use on a vehicle. As will later appear, tube 10 differs in several important respects from the usual inner tube; however, in common therewith, it has the usual valve stem 11 through which it may be filled with air or the like under pressure.

Curing rim 12 (see Figure 2) comprises a metal ring which is adapted to be inserted within the tire to be retreaded after the curing tube has been positioned therein and before the latter is inflated. This curing ring, as will be understood, provides a rigid annular abutment which confines the tube within the tire. As is the usual practice, rim 12 is formed of a plurality of rim segments 13, 14, 15, 16 and 17 hingedly connected together to permit the rim to be folded (as indicated in Figure 3) to provide for insertion of the rim within the tire and between the side walls thereof and removal of the rim therefrom. Note that rim segments 15, 16 and 17 progressively decrease in length so that the segments will nest with each other when the rim is folded.

The hinge construction which as shown in Figure 4 is that which connects segments 13 and 14 together; however, since this construction is typical of that connecting respective adjoining ends of the segments together, a description of this one hinge construction will be sufficient. As seen in Figure 4, it will be noted that the end of rim segment 14 which is adjacent rim segment 13 carries spaced bracket members 18 which may be welded or otherwise secured to the rim segment. Each bracket member provides a pair of relatively closely spaced upstanding ears or lugs 19 having aligned apertures for passing pivot pin 20.

Welded or otherwise secured to that end of rim segment 13 which adjoins segment 14 is a bracket 21 having spaced, upstanding lugs 22 whose spacing is such as to fit between respective lugs 19 of respective brackets 18. It is to be understood that the spacing between respective lugs 19 of each bracket 18 is such as to closely receive therebetween respective lugs 22 of bracket so that the hinge connection provides for maximum rigidity to guard against misalignment between the segments. Lugs 22 are also provided with aligned apertures for passing pivot pin 20 so that insertion of the pivot pin through the aligned apertures pivotally connects the segments together in alignment with each other. To prevent unintentional withdrawal of pivot pin 20 from the apertures in lugs 19, 22 and, as herein shown, the pivot pin may have a head 23 at one end and may be transversely apertured at the other end to pass a cotter pin 24.

As best seen in Figure 5, curing rim 12, shown therein in transverse section, provides an annular surface 25 of a width to fit within a tire T to be retreaded and extending from side wall to side wall thereof so as to confine curing tube 10 within the tire. For a purpose to be disclosed, it is preferable that annular surface 25 of the curing rim be somewhat convex as indicated.

Curing tube 10, as also shown in transverse section in Figure 5, has an arcuate portion 26 generally configured to conform with the interior of the tire adjacent its tread t and a concave portion 27 preferably generally configured to conform to the convex surface 25 of curing rim 12. Note that tube portions 28, intermediate tube portions 26, 27 are sharply rounded so as to leave a generally triangular annular space 29 between the rim and the tube adjacent the juncture of the rim with respective side walls of the tire. For a purpose to appear, tube portions 28 are preferably heavier in wall thickness than the remainder of the tube.

To assemble the curing tube and the curing rim with the tire preparatory to placing the tire in the mold for curing a new tread thereon, the deflated curing tube 10 will first be placed in the tire. Assuming the curing rim to be unfolded as shown in Figure 2, the pivot pin 20, intermediate rim segments 13, 17, will be removed to permit the rim to be folded as shown in Figure 3. The folded rim will then be inserted between the side walls of the tire and once again unfolded to the position shown in Figure 2. Pin 20, previously removed from between rim segments 13, 17, will be replaced to prevent collapse of the rim when the tube is inflated. Although not shown, it is to be understood that one of the rim segments will be apertured to pass valve stem 11 of the curing tube.

With both the curing tube or bag and the curing rim positioned within the tire as shown in Figure 5, the tire will be placed in the mold (not shown) and the tube inflated through valve stem 11 to expand the tire into the mold contour. Upon expansion of the tube, there will be a tendency of the latter to expand into the spaces 29; however, the thickness of the tube portions 28 will resist such tendency.

After the tire hase been cured, the curing tube will be deflated and the tire removed from the mold. Pin 20, adjacent rim segments 13, 17, will then be removed and the rim then folded to the position shown in Figure 3 so that it may be removed from the tire. The curing tube will then be removed from the tire whereupon the foregoing operations may be repeated to cure another tire.

It is to be understood that expansion of the rim as it is unfolded and locked in position between the side walls of the tire will exert a compressive pressure upon the tube; however, because of the relative transverse configurations of the outer periphery of the rim and the inner periphery of the tube, such pressure is limited to the central portion of the tube. Accordingly, even though the size of the tube has increased through long use, the rim may be easily expanded and locked into place because the increased transverse size of the tube will be accommodated by the spaces 29. Thus, a problem existent in certain prior art constructions has been completely solved. Another problem present in certain prior art constructions, that of the tube becoming pinched between the edge of the rim and the tire wall and chaffing at this point, has also been eliminated since the thickness of tube portions 28 and the sharp angle formed at the juncture of the rim edge with the side wall of tire (as a result of the convexity of the rim) will insure against engagement between the tube and the rim edge.

Another advantage which occurs as a result of the convex rim is as follows: After considerable tube growth and when the transverse size of the tube is actually larger than the space provided for it between the expanded rim and the inside of the tire, the rim, as it is expanded into place against the tube, will first engage the center of tube portion 27 (see Figure 5) and force it radially outwardly. Continued expansion of the rim will cause it to progressively engage and exert a radially outward force on successive portions of tube portion 27 spaced laterally outwardly from the center thereof until such radially outward force is concentrated upon portion 27 adjacent the rounded tube portions 28.

With the pressure exerted by the rim being so concentrated, the center of tube portion 27 will tend to bulge radially outwardly, bearing in mind it was initially urged in this direction upon initial expansion of the rim, away from the rim, as shown in a somewhat exaggerated manner by the dot dash lines in Figure 5. Thus, the excess size of the tube will not interfere with expansion of the rim into place nor will the tube have a tendency to escape around the marginal edges of the rim. Thereafter, when the tube is inflated, the internal pressure will cause the tube to seat against the rim and assume the position shown in full lines in Figure 5.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

Apparatus for retreading a tire, comprising an inflatable hollow annular resilient curing bag insertable when deflated within said tire for disposition adjacent the tread portion thereof, said curing bag having an arcuate outer periphery conforming to the inner tread surface of the tire and a concave inner periphery merging into sharply curved connecting portions of increased thickness of material, and a collapsible rim insertable within said tire and expandable to annular shape for confining said bag against the tire tread portion, the expanded rim having an outer convex periphery engaging against in substantial conformity with the concave inner bag periphery to reduce tendency of the inner bag periphery to stretch laterally under inflation pressure, opposite side edges of said expanded rim defining with the inner side wall surfaces of said tire and with said sharply curved connecting portions of said bag a pair of annular spaces of triangular cross section for protecting said sharply curved bag portions from pinching between said rim side edges and the adjacent interior tire wall surfaces when the curing bag is inflated.

References Cited in the file of this patent
UNITED STATES PATENTS

| | | |
|---|---|---|
| 1,779,385 | Wirgman | Oct. 21, 1930 |
| 1,799,933 | Snyder | Apr. 7, 1931 |
| 2,322,546 | Sepin | June 22, 1943 |
| 2,561,573 | Hovlid et al. | July 24, 1951 |
| 2,695,424 | Madison et al. | Nov. 30, 1954 |
| 2,779,061 | Hosking | Jan. 29, 1957 |